United States Patent
Webber

(10) Patent No.: US 12,290,165 B2
(45) Date of Patent: May 6, 2025

(54) INTERDENTAL CLEANING DEVICE

(71) Applicant: Jamie Webber, Robina (AU)

(72) Inventor: Jamie Webber, Robina (AU)

(*) Notice: Subject to any disclaimer, the term of this patent is extended or adjusted under 35 U.S.C. 154(b) by 357 days.

(21) Appl. No.: 17/637,441

(22) PCT Filed: Aug. 24, 2020

(86) PCT No.: PCT/AU2020/000085
§ 371 (c)(1),
(2) Date: Feb. 22, 2022

(87) PCT Pub. No.: WO2021/035275
PCT Pub. Date: Mar. 4, 2021

(65) Prior Publication Data
US 2022/0273092 A1 Sep. 1, 2022

(30) Foreign Application Priority Data

Aug. 26, 2019 (AU) ................. 2019903109

(51) Int. Cl.
*A46B 5/00* (2006.01)
*A46B 5/02* (2006.01)
(Continued)

(52) U.S. Cl.
CPC ............... *A46B 5/007* (2013.01); *A46B 5/02* (2013.01); *A46B 7/042* (2013.01); *A46B 9/08* (2013.01);
(Continued)

(58) Field of Classification Search
CPC ..... A46B 2200/108; A46B 7/042; A46B 9/04; A46B 9/042; A46B 9/08; A46B 9/10;
(Continued)

(56) References Cited

U.S. PATENT DOCUMENTS 3,947,910 A * 4/1976 Akerman ............... A46B 13/08
132/229
4,693,622 A * 9/1987 Booth ................ A46B 11/0027
401/175
(Continued)

FOREIGN PATENT DOCUMENTS

AU    2015230466 B9    2/2020
CH        698502 B1    8/2009
(Continued)

OTHER PUBLICATIONS

European Search Report issued on European Patent Application No. 20858554.7, dated Sep. 15, 2022.

*Primary Examiner* — Eric J Rosen
*Assistant Examiner* — Aaron R McConnell
(74) *Attorney, Agent, or Firm* — Fox Rothschild LLP

(57) ABSTRACT

An interdental cleaning device includes a handle. A cleaning head assembly is mounted on the handle. The cleaning head assembly includes a head that is mounted on the handle, the head defining a cavity. An interdental cleaning member is mounted on the head to extend into the cavity, the interdental cleaning member including an interdental cleaning element. A plunger is mounted on the head, the plunger being reciprocally displaceable relative to the head between an operative position in which the plunger is at least partially retracted into the cavity and an inoperative position in which the plunger extends from the cavity. A spring mechanism is interposed between the plunger and the head so that the movement of the plunger into the operative position is against a bias of the spring mechanism. The plunger defines a longitudinally extending passage that is dimensioned to accommodate the cleaning element. The interdental cleaning member is positioned so that the interdental cleaning element extends from a distal opening of the longitudinal (Continued)

passage when the plunger is in the operative position and is positioned within the plunger when the plunger is in the inoperative position.

11 Claims, 4 Drawing Sheets

(51) Int. Cl.
*A46B 7/04* (2006.01)
*A46B 9/08* (2006.01)
*A46B 15/00* (2006.01)

(52) U.S. Cl.
CPC .... *A46B 15/0095* (2013.01); *A46B 2200/106* (2013.01); *A46B 2200/108* (2013.01)

(58) Field of Classification Search
CPC ....... A61C 15/00; A61C 17/22; A61C 17/222; A61C 17/225; A61C 17/3463
USPC ........................................................ 15/167.1
See application file for complete search history.

(56) References Cited

U.S. PATENT DOCUMENTS

| | | | |
|---|---|---|---|
| 5,394,584 A * | 3/1995 | Breitschmid | A46B 7/04 |
| | | | 15/176.5 |
| 7,147,470 B2 | 12/2006 | Lesage | |
| 2004/0197735 A1* | 10/2004 | Lesage | A61C 15/00 |
| | | | 433/141 |
| 2009/0029323 A1* | 1/2009 | Nejat | A46B 13/023 |
| | | | 15/22.1 |
| 2017/0340421 A1 | 11/2017 | Eidenbenz | |
| 2019/0151056 A1 | 5/2019 | Zmiyiwsky et al. | |

FOREIGN PATENT DOCUMENTS

| | | |
|---|---|---|
| CN | 104905547 B | 8/2017 |
| CN | 107456289 A | 12/2017 |
| CN | 108403238 A | 8/2018 |
| EP | 2687124 A1 | 1/2014 |
| TW | M566554 U | 9/2018 |
| WO | 2016174263 A1 | 11/2016 |
| WO | 2017174734 A1 | 10/2017 |
| WO | 2018219636 A1 | 12/2018 |
| WO | 2019086578 A1 | 5/2019 |

* cited by examiner

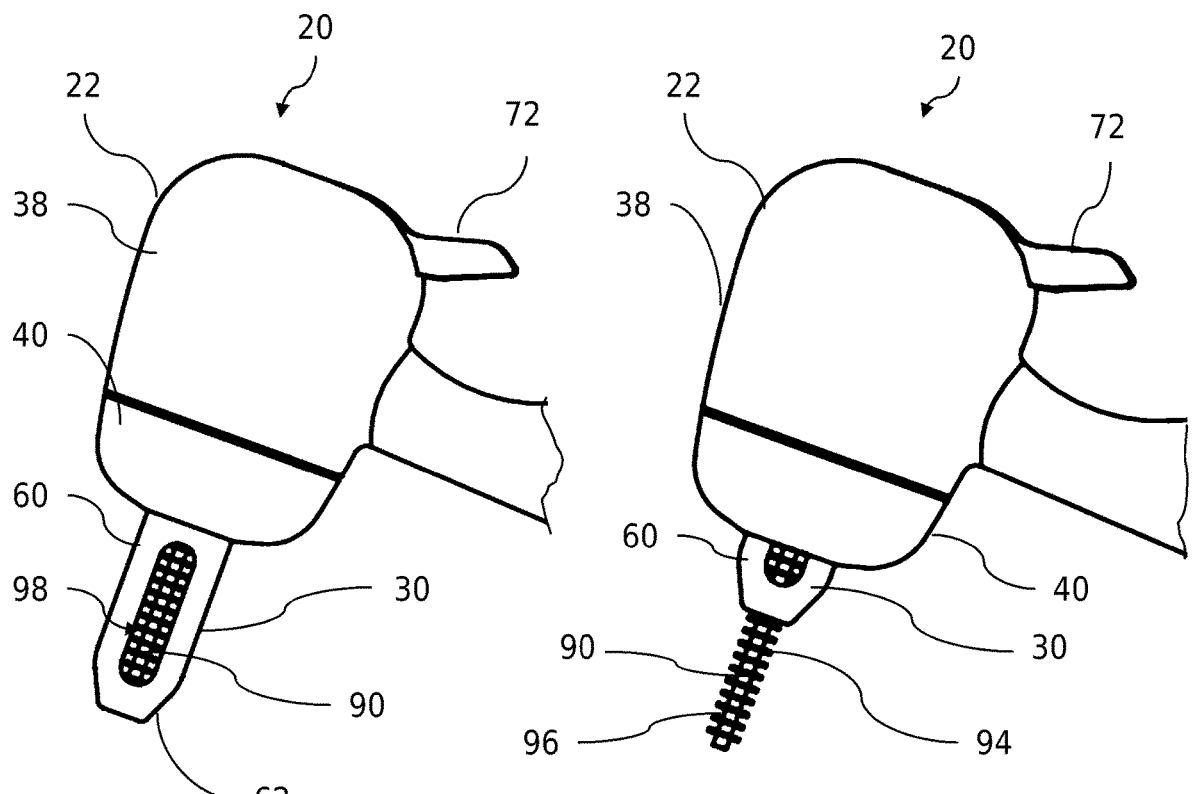
Figure 3
Figure 4
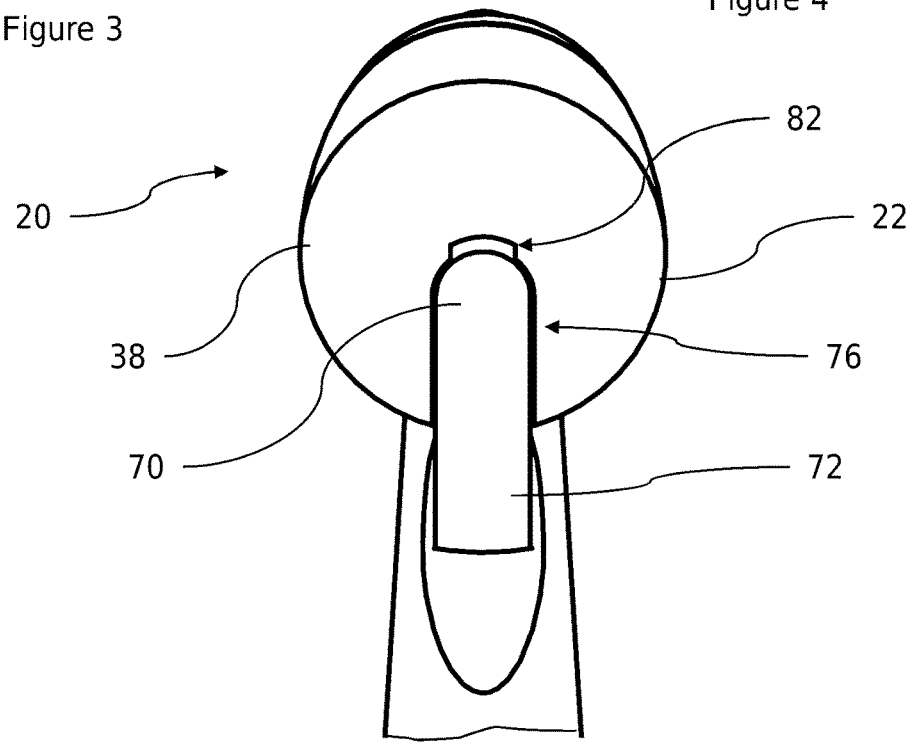
Figure 5

INTERDENTAL CLEANING DEVICE

FIELD OF THE INVENTION

This invention relates to an interdental cleaning device.

BACKGROUND OF THE INVENTION

The field of dental hygiene presents a large range of solutions for cleaning teeth. Toothbrushes are available in many variations and include a large array of manual and electrically driven devices. However, a problem with toothbrushes is that they generally do not remove biofilm and other detritus between teeth.

Dental floss is effective for caries protection between contact points and is introduced as a thin thread in interdental spaces. Some disadvantages associated with dental floss are the risk of injury, difficulty in handling, and inability to use in certain conditions, such as with dental bridges, fixed retainers and some orthodontic appliances. Furthermore, the use of dental floss can result in compaction of biofilm and debris down towards the gum line.

The use of interdental devices, such as brushes or probes, is also a common form of interdental care. The brushes have bristles or other cleaning projections, that can be arranged much like the bristles on a bottle brush or the like. The projections can be defined by an elastomeric material that is ribbed, or the like, or can be in the form of bristles, to provide a cleaning effect. These forms of interdental devices can be more effective than dental floss because of their ability to be used in conditions not suitable for dental floss. Also, they can be used to avoid the compaction of the biofilm and debris, as explained above. Interdental brushes are available in various shapes and thicknesses and usually include a handle for gripping the brush and a brush insert which is used for interdental cleaning.

The brush inserts are subject to high wear and can require regular replacement. Furthermore, the bristles of the brush insert are usually attached to a wire body which can deform in use. Handling of the interdental brushes can require a certain level of dexterity and motor skills which can diminish with age.

Various attempts have been made to improve the ergonomics and effectiveness of interdental cleaning devices.

European Patent Publication No. EP2687124A1 describes a support device for an interdental brush. In this document, there is described a handle and a head mounted on the handle in a rotatable manner. An interdental brush is mounted on the head. The head can be rotated with respect to the handle from a position in which the brush is aligned with the handle to a position in which the brush is angled with respect to the handle.

Australian patent application AU2015230466 describes an interdental cleaning device with a built-in interdental brush. The brush can be extended from, and retracted into, a bent tube by operating a sliding block. In use, an end of the tube is aligned with a gap between teeth and the brush is reciprocally manipulated to move to and fro between the teeth.

International application PCT/EP2017/058276 describes an interdental cleaning device that has a body that can be actuated or bent to cause a cleaning element to be extended and retracted from the body.

U.S. patent application Ser. No. 15/524,909 describes an interdental brush having a body, a handle and a guide channel. A connecting element, with a cleaning body, can be displaced reciprocally in the guide channel by means of an operating element between retracted and extended positions to carry out a cleaning operation.

International application PCT/EP2018/062516 describes an interdental cleaning device that has a main part with a first limb and a second limb that can be pivoted towards and away from each other. A positioning aid is on a free end of the first limb. An interdental brush is mounted on the second limb and can be guided reciprocally through the positioning aid by manipulating the limbs.

The devices described in the above references each require some form of manipulation subsequent to proper operative location of the devices. Such further manipulation requires the use of fingers or thumbs in addition to simply holding the device. This can make repeated use of the devices onerous. Furthermore, such subsequent manipulation, in addition to holding, can result in extraneous movement of the device, causing the cleaning brush or element to be unnecessarily bent or misapplied, so reducing the effectiveness of a cleaning process.

SUMMARY OF THE INVENTION

According to a first aspect of the invention, there is provided an interdental cleaning device, which comprises:
a handle; and
a cleaning head assembly that is mounted on the handle, the cleaning head assembly including:
  a head that is mounted on the handle, the head defining a cavity;
  an interdental cleaning member that is mounted on the head to extend into the cavity, the interdental cleaning member including an interdental cleaning element; and
  a plunger that is mounted on the head, the plunger being reciprocally displaceable relative to the head between an operative position in which the plunger is at least partially retracted into the cavity and an inoperative position in which the plunger extends from the cavity, a spring mechanism being interposed between the plunger and the head so that the movement of the plunger into the operative position is against a bias of the spring mechanism, the plunger defining a longitudinally extending passage that is dimensioned to accommodate the cleaning element, and the interdental cleaning member being positioned so that the interdental cleaning element extends from a distal opening of the longitudinal passage when the plunger is in the operative position and is positioned within the plunger when the plunger is in the inoperative position.

Thus, the interdental cleaning device only requires a reciprocal application and reduction of pressure once the device is in a proper operative location in order to carry out a cleaning process. More particularly, a user only needs to hold the interdental cleaning device and can achieve a reciprocal cleaning effect without the use of fingers or thumbs. This can avoid potential displacement of the plunger during the cleaning operation, so avoiding damage to the cleaning device and/or injury to the user and/or inefficient cleaning. It follows that the interdental cleaning device can at least ameliorate the disadvantages associated with the devices referred to in the above background of the invention.

The handle may be elongate. The handle may include a gripping portion that is configured to facilitate gripping by a user. The handle may include an extension that extends angularly from the gripping portion.

The head may be mounted on the extension. The head may have a distal side and a proximal side. A generally central axis of the head may extend through the distal and proximal sides of the head. In one embodiment, the head may be generally cylindrical, with the central axis defining an axis of rotation. However, it is to be appreciated that the head can have other shapes, depending on desired ergonomics, functionality or aesthetics, for example.

The head may have a proximal member or portion and a distal member or portion. The distal member may be detachably connected to the proximal member. For example, the proximal member may include a threaded shank and the distal member may include a threaded socket so that the distal member can be screwed onto the proximal member.

The proximal member may define part of the cavity in the form of an elongate passage that extends through the proximal member to open at respective proximal and distal sides of the proximal member. An inner surface of the proximal member that defines the passage may be stepped in proximity to the proximal side to define a distally facing shoulder. An end wall of the distal member may define a passage that is coaxial with the passage of the proximal member, the passage of the distal member being narrower than the passage of the proximal member so that a proximally facing shoulder is defined by the end wall of the distal member and the inner surface of the proximal member.

The plunger may include a flange and a nose extending from the flange. The flange may be dimensioned to seat on the proximally facing shoulder. The nose may be dimensioned to extend through the passage of the distal member end wall. A free distal end of the nose may be tapered.

The passage defined by the plunger may be a longitudinal bore that extends through the flange and the nose. The bore may be coaxial with the passages of the proximal and distal members.

The spring mechanism may include a coil spring interposed between the proximally facing shoulder and the flange of the plunger. Thus, retraction of the plunger into the passage of the proximal member is against a bias of the coil spring and movement of the plunger into the inoperative position is under action of the coil spring.

The interdental cleaning member may include a carrier that is releasably engageable with the proximal member at a proximal end of the elongate passage. To that end, the proximal member and the carrier may define a clipping mechanism so that the carrier can be clipped onto and unclipped from the proximal member. The proximal member and the carrier may be detachably connected to each other in various different ways. For example, the carrier could be screwed onto the proximal member.

The carrier may include a tubular member that extends into the elongate passage, coaxially with the elongate passage, when the carrier is clipped onto the proximal member. A proximal portion of a stem of an interdental cleaning brush is retained in the tubular member, while a distal portion, carrying bristles, or other cleaning projections, extends from the tubular member. The distal portion is received in the longitudinal bore of the plunger. The plunger is dimensioned so that, when the plunger is in the inoperative position, the distal portion is wholly contained within the longitudinal bore. Given that the carrier is fixed relative to the proximal member and the plunger is capable of reciprocal movement relative to the proximal member, the distal portion of the interdental cleaning brush will extend from the plunger when the plunger is retracted or urged into the cavity, provided there is nothing obstructing the distal portion. Thus, the distal end of the nose can be positioned so that the bore is generally aligned with a gap between successive teeth. In that position, a user can simply urge the interdental cleaning device against the teeth, and the cleaning brush will extend into the gap. By applying reciprocal pressure, a user can achieve a cleaning or scrubbing effect between the teeth without having to use fingers or thumbs.

According to a second aspect of the invention, there is provided an interdental cleaning device, which comprises:
- a handle; and
- a cleaning head assembly that is mounted on the handle, the cleaning head assembly including:
  - a head that is mounted on the handle, the head defining a cavity;
  - an interdental cleaning member that is mounted on the head to extend into the cavity, the interdental cleaning member including a carrier for retaining an interdental cleaning element; and
  - a plunger that is mounted on the head, the plunger being reciprocally displaceable relative to the head between an operative position in which the plunger is at least partially retracted into the cavity and an inoperative position in which the plunger extends from the cavity, a spring mechanism being interposed between the plunger and the head so that the movement of the plunger into the operative position is against a bias of the spring mechanism, the plunger defining a longitudinally extending passage that is dimensioned to accommodate the cleaning element, and the interdental cleaning member being positioned so that the interdental cleaning element extends from a distal opening of the longitudinal passage when the plunger is in the operative position and is positioned within the plunger when the plunger is in the inoperative position.

Embodiments of the invention are now described, with reference to the accompanying drawings. The purpose of the following description is to describe to a person of ordinary skill in the field a way in which the invention can be put into practice. As such, the following description is not intended to limit the scope of the appended claims or the preceding paragraphs.

BRIEF DESCRIPTION OF THE DRAWINGS

FIG. 3 shows a side view of a cleaning head assembly of the interdental cleaning device, with a plunger in an inoperative position.

FIG. 4 shows a side view of the cleaning head assembly of the interdental cleaning device, with the plunger in an operative position.

FIG. 5 shows a top plan view of the cleaning head assembly of the interdental cleaning device.

DETAILED DESCRIPTION

Figure 1:
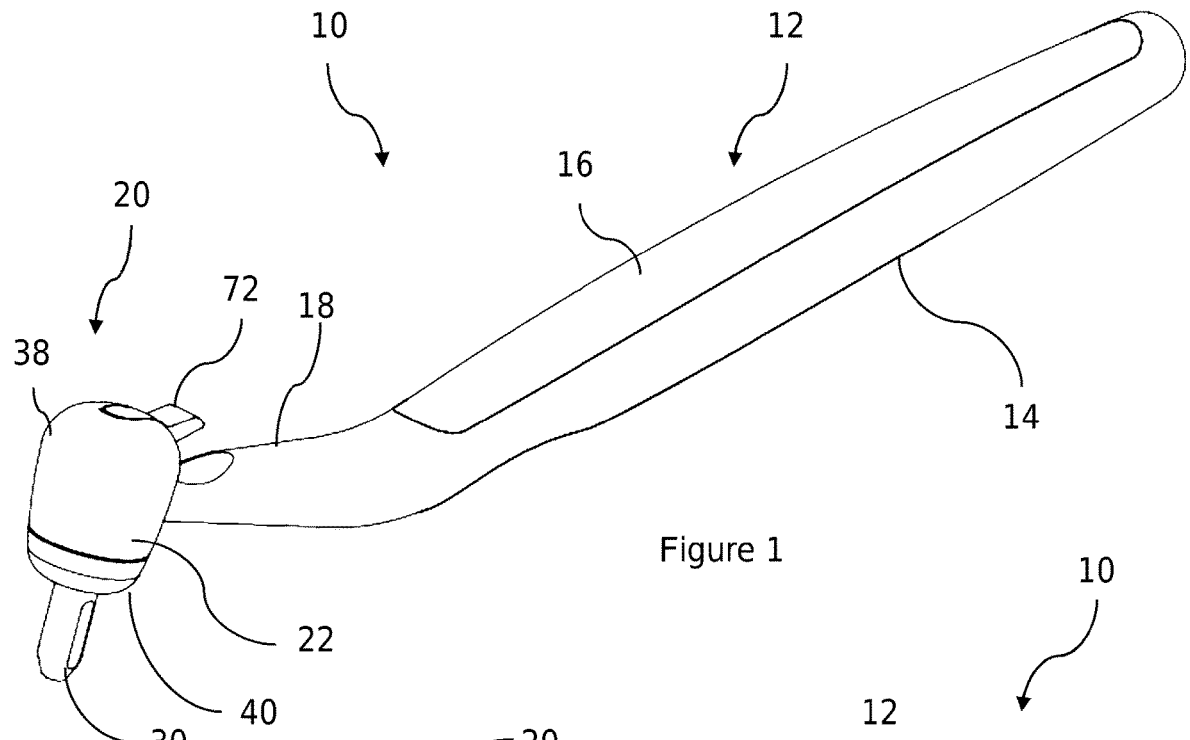
FIG. 1 shows a three-dimensional view of an embodiment of an interdental cleaning device, in accordance with the invention.
Figure 2:
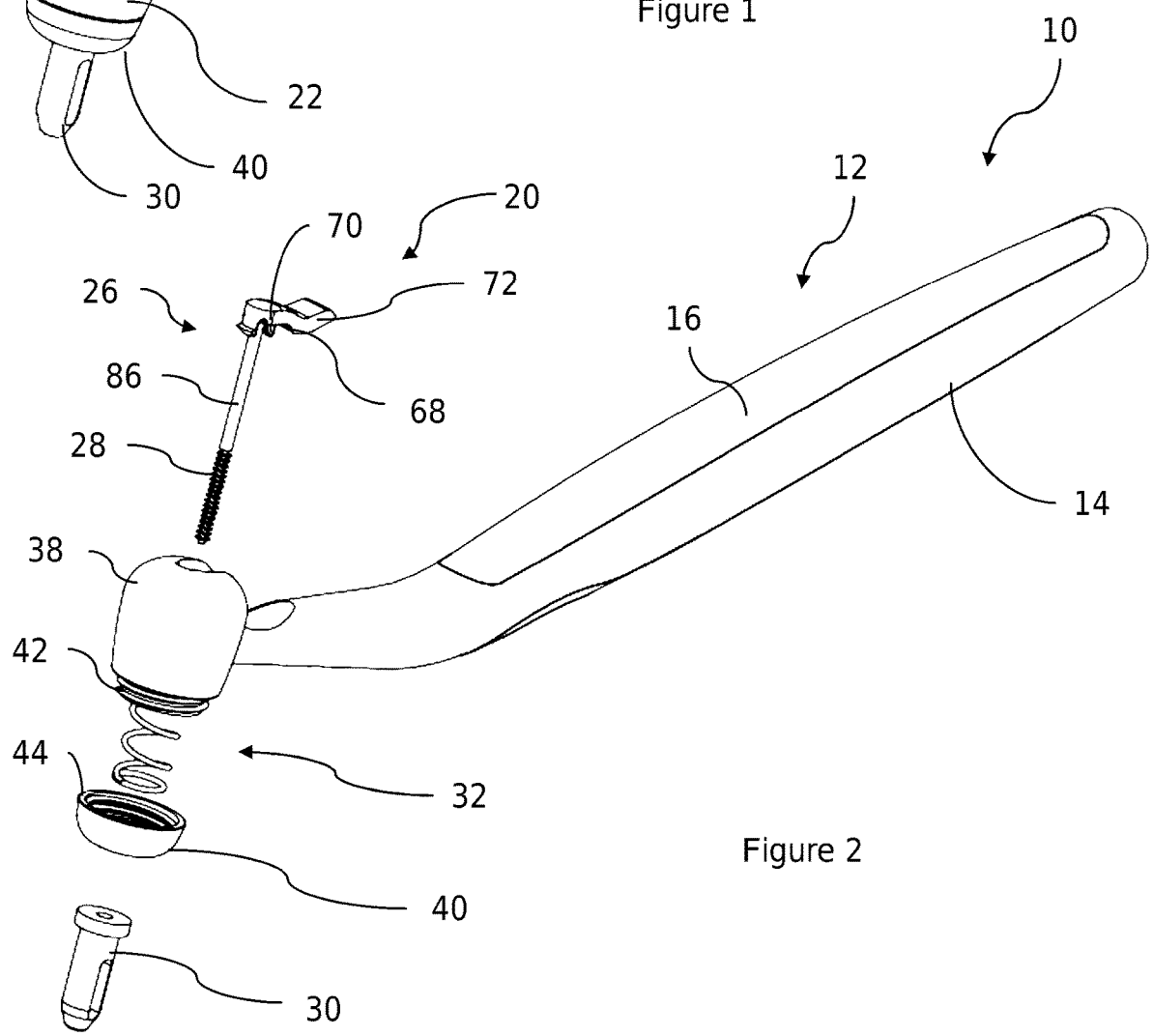
FIG. 2 shows a partially exploded view of the interdental cleaning device.

In the drawings, reference numeral 10 generally indicates an embodiment of an interdental cleaning device, in accordance with the invention.

The interdental cleaning device 10 includes a handle 12. The handle 12 can be configured similarly to a conventional toothbrush. That is, it can be configured to provide appropriate ergonomic characteristics for manipulation. The handle 12 includes a gripping portion 14. The gripping portion 14 can include suitable inserts 16 to enhance gripping of the portion 14 by a user. The handle 12 includes an extension 18 that extends angularly from the gripping portion 14 for ergonomic efficiency.

Figure 6:
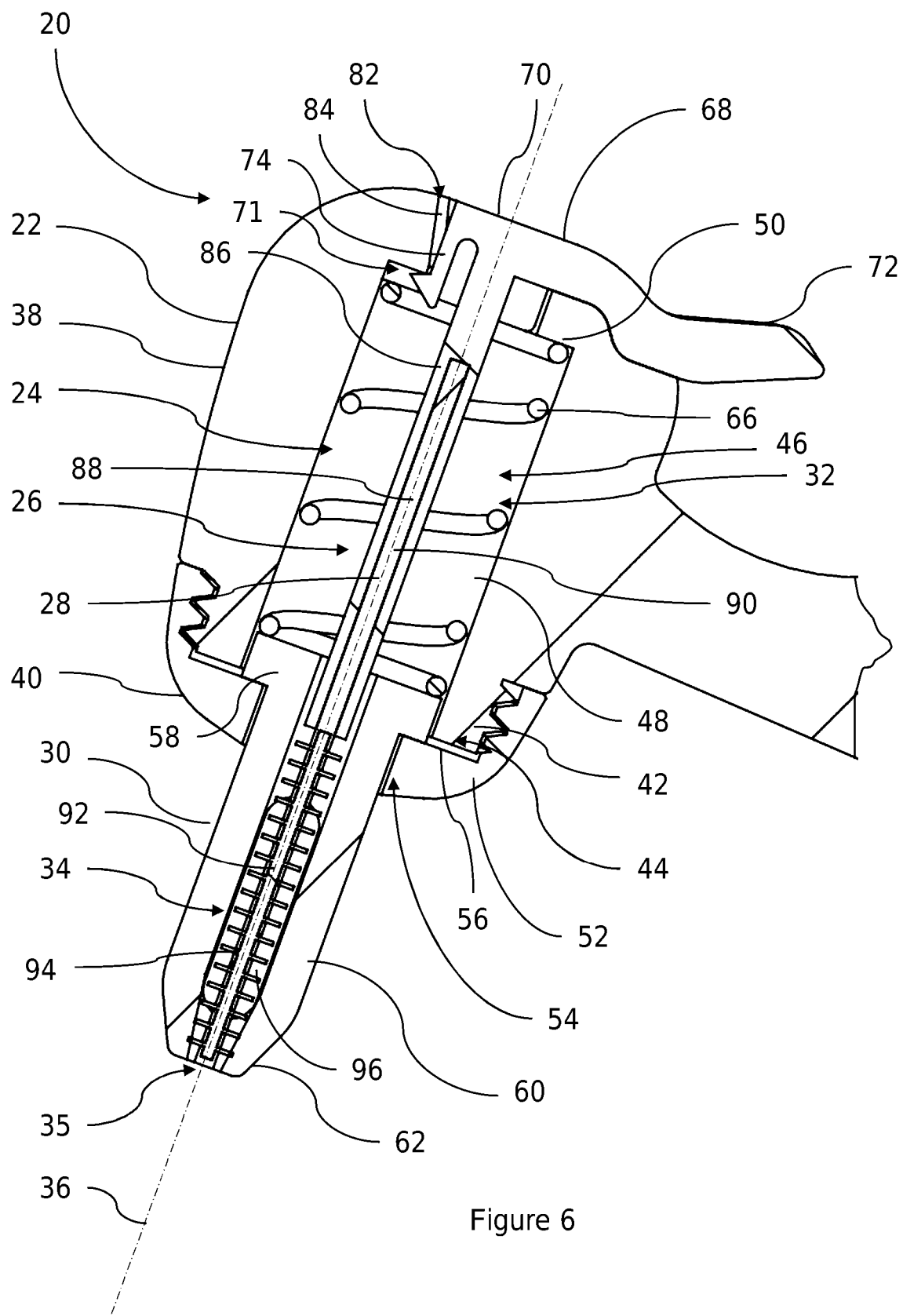
FIG. 6 shows a side sectioned view of the cleaning head assembly of the interdental cleaning device.

A cleaning head assembly 20 is mounted on the handle 12. The cleaning head assembly 20 includes a head 22 that is mounted on the extension 18. The head 22 defines a cavity 24 (FIG. 6). An interdental cleaning member 26 is mounted on the head 22 to extend into the cavity 24. The interdental cleaning member 26 includes an interdental cleaning element 28.

A plunger 30 is mounted on the head 22. The plunger 30 is reciprocally displaceable relative to the head 22 between an operative position (FIG. 4) in which the plunger 30 is at least partially retracted into the cavity 24 and an inoperative position (FIG. 3) in which the plunger 30 extends from the cavity 24. A spring mechanism 32 (FIG. 6) is interposed between the plunger 30 and the head 22 so that movement of the plunger 30 into the operative position is against a bias of the spring mechanism 32. The plunger 30 defines a longitudinally extending passage or bore 34 that is dimensioned to accommodate the cleaning element 28. The interdental cleaning member 26 is positioned so that the interdental cleaning element 28 extends from a distal opening 35 of the bore 34 when the plunger 30 is in the operative position and is positioned within the plunger 30 when the plunger 30 is in the inoperative position. Thus, the interdental cleaning element 26 can be automatically retracted into the plunger 30, to protect the cleaning element 26, after use.

The head 22 has a generally central axis 36 (FIG. 6) extending through distal and proximal sides of the head 22. In this example, the head 22 is generally frustoconical. Thus, the axis 36 can be an axis of rotation. It is to be appreciated that the head 22 can have other shapes, depending on desired ergonomics, functionality or aesthetics, for example.

The head 22 has a proximal member 38 and a distal member 40. The distal member 40 is detachably connected to the proximal member 38. In this example, the proximal member 40 includes a threaded shank 42 and the distal member 40 includes a threaded socket 44. It will be appreciated that various other forms of detachable connection for the proximal and distal members 38, 40 would be suitable.

The proximal member 38 defines part of the cavity 24 in the form of an elongate passage 46 that extends through the proximal member 38 to open at respective proximal and distal sides of the proximal member 38. An inner surface 48 of the proximal member 38 that defines the passage 46 is stepped in proximity to the proximal side to define a distally facing shoulder 50. An end wall 52 of the distal member 40 defines a passage 54 that is coaxial with the passage 46. The passage 54 is narrower than the passage 46 so that a proximally facing shoulder 56 is defined by the end wall 52 and the inner surface 48.

The plunger 30 includes a flange 58 and a nose 60 that extends from the flange 58. The flange 58 is dimensioned to seat on the proximally facing shoulder 56. The nose 60 is dimensioned to extend through the passage 54 of the end wall 52. A free distal end 62 of the plunger 30 is tapered. This facilitates interdental location of the nose 60, in use.

The longitudinal bore 34 extends through the flange 58 and the nose 60, the nose 60 defining the distal opening 35. The bore 34 is coaxial with the passages 46 and 54.

The spring mechanism 32 includes a coil spring 66 that is interposed between the distally facing shoulder 50 and the flange 58. Thus, retraction of the plunger 30 into the passage 46 of the proximal member 38 is against a bias of the coil spring 66 and extension of the plunger 30 out of the distal member 40 is under action of the coil spring 66. It follows that a user can place the distal end 62 of the nose 60 in a position in which the longitudinal bore 34 is generally aligned with a gap between teeth and exert pressure on the teeth, causing the nose 62 to retract against the bias of the coil spring 66. Upon release of that pressure, the nose 62 automatically extends from the head 22 under the action of the coil spring 66.

The interdental cleaning member 26 includes a carrier 68 that is releasably engageable with the proximal member 38 at a proximal end of the elongate passage 46. To that end, the proximal member 38 and the carrier 68 define a clipping mechanism 71 so that the carrier 68 can be clipped onto and unclipped from the proximal member 38.

Figure 7:
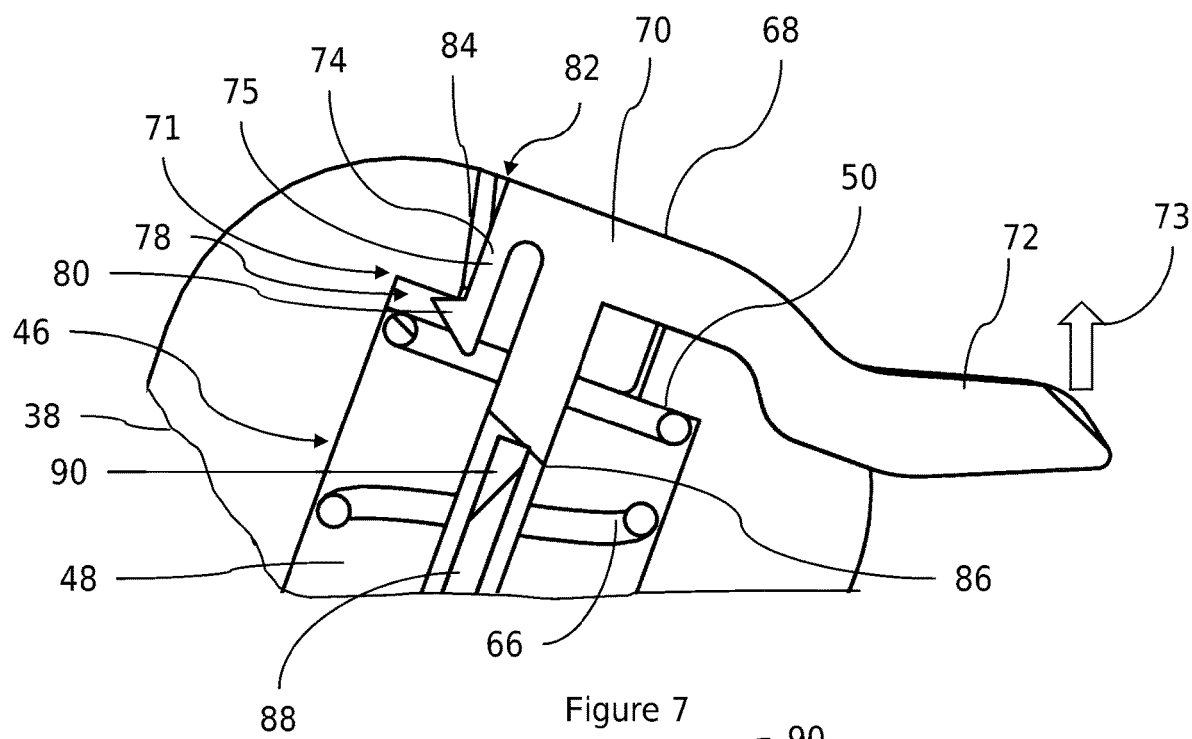
FIG. 7 shows a detailed view of a carrier of an interdental cleaning member mounted on a proximal member of the interdental cleaning device.

As can be seen in FIG. 6, the carrier 68 includes a clip body 70. A clip handle 72 extends towards the gripping portion 14 when the clip body 70 is in an operative position. A clip member 74 extends generally parallel to the central axis 36. The carrier 68 is of a unitary, one-piece construction of a resiliently flexible material so that the clip member 74 can pivot or deflect, against a bias of the material, towards the handle 72. The proximal member 38 defines a slotted recess 76 (FIG. 5), which accommodates the handle 72, so that the handle 72 and the body 70 are flush with a proximal surface of the member 38. The proximal member 38 includes a recessed catch formation 78 in the shoulder 50 (FIG. 7). The clip member 74 includes a clip arm 75 and a lip 80. The lip 80 tapers outwardly and proximally with respect to the clip arm 75. The catch formation 78 and the lip 80 are positioned so that, when the body 70 is urged into the passage 46, the lip 80 is initially driven inwardly and then springs into the catch formation 78 to fasten the carrier 68 to the proximal member 38.

The proximal member 38 defines a release notch 82 opposite the slotted recess 76. The release notch 82 is dimensioned to receive the clip member 74 when the carrier is urged into the passage 46. The proximal member 38 includes an internal, sloped surface 84 that faces the slotted recess 76 to define a side of the release notch 82. The sloped surface 84 slopes inwardly from a proximal side of the proximal member 38 and terminates at the catch formation 78. Thus, when the body 70 is urged into the passage 46, the lip 80 can slide along the sloped surface 84 prior to snapping into the catch formation 78. To remove the carrier 78, the clip handle 72 can be lifted in the direction of an arrow 73 (FIG. 7) to tilt the body 70 towards the sloped surface 84 with the clip member 74 rotating about an edge defined by the sloped surface 84 and the shoulder 50. This serves to release the lip 80 from the recessed catch formation 78.

The carrier 68 includes a tubular member in the form of a tube 86 that extends from the body 70 and is interposed between the clip handle 72 and the clip member 74. A proximal portion 88 of the interdental cleaning element 28 is retained in the tube 86. The interdental cleaning element 28 is an interdental cleaning brush 92. Thus, the proximal portion 88 is a stem 90 of the interdental cleaning brush 92 that is retained in the tube 86. A distal portion 94 of the brush 92 carries interdental cleaning projections such as bristles 96. It will readily be appreciated that other forms of cleaning projections can be arranged on the distal portion 94.

Figure 8:
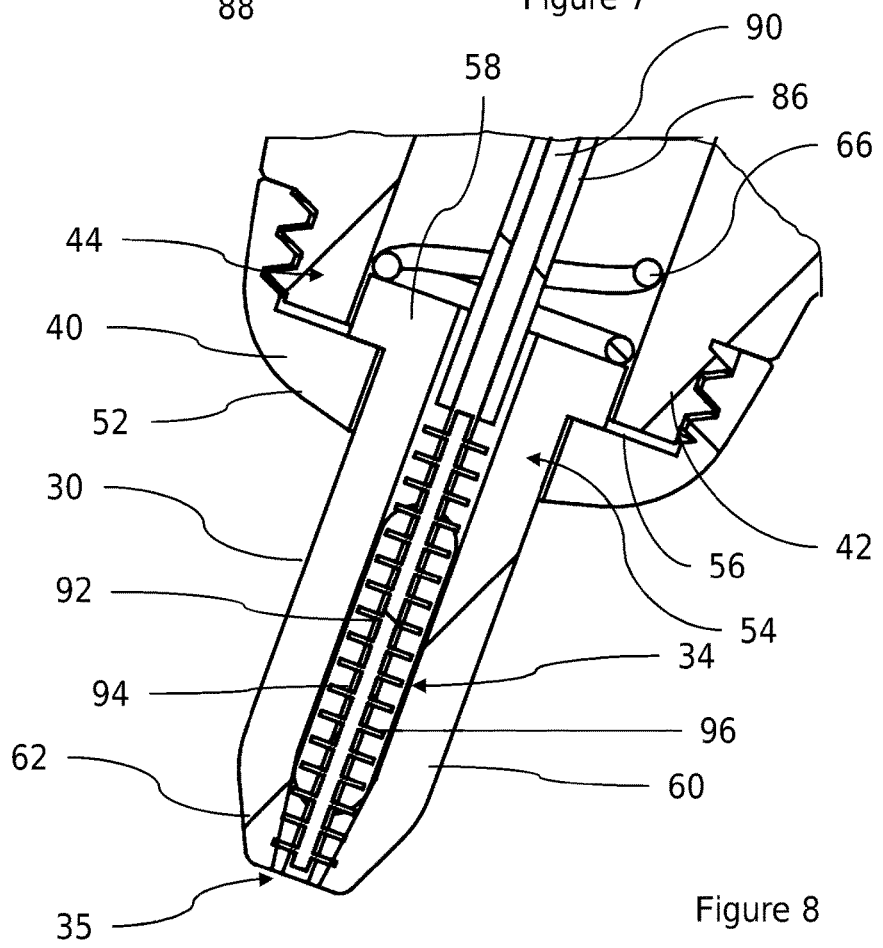
FIG. 8 shows a detailed view of a plunger mounted on a distal member of the interdental cleaning device.

The distal portion 94 is received in the longitudinal bore 34 of the plunger 30. The plunger 30 is dimensioned so that, when the plunger 30 is in the inoperative position, such as shown in FIGS. 6 and 8, the distal portion 94 is wholly contained within the longitudinal bore 34. Given that the carrier 68 is fixed relative to the proximal member 38, and the plunger 30 is capable of reciprocal movement relative to the proximal member 38, the distal portion 94 will extend from the plunger when the plunger 30 is urged into the cavity 24, by the exertion of pressure, as described above, provided there is nothing to obstruct the distal portion 94. Thus, the distal end 62 of the nose 60 can be positioned so that the bore 34 is generally aligned with a gap or space between successive teeth and with the opening 35 in register with the gap. In that position, a user can simply urge and release the cleaning device 10 with respect to the successive teeth with the result that the distal portion 94 is reciprocally displaced within the gap, so providing a cleaning or scrubbing effect between the teeth. It will be appreciated that such reciprocal displacement can be achieved without the use of fingers or thumbs, so obviating the need for any form of manual dexterity, which could be problematic for elderly or infirm users.

The nose 60 of the plunger 30 defines one or more lateral openings 98 in communication with the longitudinal bore 34 (FIG. 3). Preferably, there are two or more openings 98 to facilitate cleaning of the distal portion 94. The openings 98 can be slotted to extend at least partially along a length of the distal portion 94 when the plunger 30 is in the inoperative position. In one embodiment, there are two openings in lateral alignment with each other so that water or cleaning liquid can pass through the plunger 30, so cleaning and/or flushing the distal portion 94.

It will be appreciated that an interdental cleaning process using the device 10 simply requires the placement of the nose 60 in an appropriate position and the urging and releasing of the entire device with respect to the gap being cleaned. This contrasts with the devices described in the background to this specification. Those devices generally require the use of fingers or thumbs to achieve the required reciprocal movement of a cleaning element. Such operation can result in a movement of the device in such a way that the cleaning element moves out of alignment with the gap, resulting in possible bending of the device and/or injury to the user and/or inefficient cleaning. With the device 10, once the nose 60 is appropriately positioned, retention of the cleaning element, for example the brush 92, in alignment with the gap being cleaned is facilitated since the manipulation of the device 10 generally requires only the use of major muscle groups.

The device 10 can be supplied with different forms of cleaning members 26, to suit different dental patterns. For example, the cleaning element 28 can be supplied with different thicknesses for different tooth gaps, as required by users. Thus, the cleaning member 26 can be configured to be disposable for replacement once the bristles 96 are worn, for example. Instead, the stem 90 of the interdental cleaning brush 92 can be detachably or removably retained in the tube 86 so that the cleaning brush 92 can be removed and replaced. It is envisaged that different plungers 30 can also be provided having differently dimensioned longitudinal bores 34 to suit differently sized cleaning brushes 92.

The appended claims are to be considered as incorporated into the above description.

Throughout this specification, reference to any advantages, promises, objects or the like should not be regarded as cumulative, composite and/or collective and should be regarded as preferable or desirable rather than stated as a warranty.

Throughout this specification, unless otherwise indicated, "comprise," "comprises," and "comprising," (and variants thereof) or related terms such as "includes" (and variants thereof)," are used inclusively rather than exclusively, so that a stated integer or group of integers may include one or more other non-stated integers or groups of integers.

When any number or range is described herein, unless clearly stated otherwise, that number or range is approximate. Recitation of ranges of values herein are intended to serve as a shorthand method of referring individually to each separate value falling within the range, unless otherwise indicated herein, and each separate value and each separate subrange defined by such separate values is incorporated into the specification as if it were individually recited herein.

Words indicating direction or orientation, such as, but not limited to, "front", "rear", "back", etc, are used for convenience. The inventor(s) envisages that various embodiments can be used in a non-operative configuration, such as when presented for sale. Thus, such words are to be regarded as illustrative in nature, and not as restrictive. Furthermore, use of the word "proximal" and its derivatives is intended to indicate a side or region of the device, according to the invention, that is positioned closest to the handle, or to a point of operation by a user. In this case, the term refers to a region that would be further from the teeth of the user, relative to any side or region referenced with the term "distal" and its derivatives.

The term "and/or", e.g., "A and/or B" shall be understood to mean either "A and B" or "A or B" and shall be taken to provide explicit support for both meanings or for either meaning.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

The invention claimed is:

1. An interdental cleaning device, which comprises:
 a handle; and
 a cleaning head assembly that is mounted on the handle, the cleaning head assembly including:
  a head that is mounted on the handle, the head defining
   a cavity and comprising;
   a distal side and a proximal side, with a generally central axis of the head extending through the distal and proximal sides of the head; and
   a proximal member and a distal member, the distal member being detachably connected to the proximal member, the proximal member defining part of the cavity in the form of an elongate passage that extends through the proximal member to open at respective proximal and distal sides of the proximal member, wherein an inner surface of the proximal member that defines the passage is stepped in proximity to the proximal side to define a distally facing shoulder, and an end wall of the distal member defining a passage that is coaxial with the passage of the proximal member, the passage of the distal member being narrower than the passage of the proximal member so that a proximally facing shoulder is defined by the end wall of the distal member, and the inner surface of the proximal member;

an interdental cleaning member that is mounted on the head to extend into the cavity, the interdental cleaning member including an interdental cleaning element; and a plunger that is mounted on the head, the plunger being reciprocally displaceable relative to the head between an operative position in which the plunger is at least partially retracted into the cavity and an inoperative position in which the plunger extends from the cavity, a spring mechanism being interposed between the plunger and the head so that the movement of the plunger into the operative position is against a bias of the spring mechanism, the plunger defining a longitudinally extending passage that is dimensioned to accommodate the cleaning element, and the interdental cleaning member being positioned so that the interdental cleaning element extends from a distal opening of the longitudinal passage when the plunger is in the operative position and is positioned within the plunger when the plunger is in the inoperative position, the plunger including a flange and a nose extending from the flange, the flange being dimensioned to seat on the proximally facing shoulder, and the nose being dimensioned to extend through the passage of the distal member end wall and the passage defined by the plunger extending through the flange and the nose and being coaxial with the passages of the proximal and distal members.

2. The interdental cleaning device as claimed in claim 1, wherein the handle is elongate and includes a gripping portion that is configured to facilitate gripping by a user and an extension that extends from the gripping portion, the head being mounted on the extension.

3. The interdental cleaning device as claimed in claim 2, wherein the extension of the handle extends angularly from the gripping portion of the handle.

4. The interdental cleaning device as claimed in claim 1, wherein the passage defined by the plunger is a longitudinal bore that extends through the flange and the nose of the plunger, the bore being coaxial with the passages of the proximal and distal members.

5. The interdental cleaning device as claimed in claim 1, wherein the nose of the plunger is tapered.

6. The interdental cleaning device as claimed in claim 1, wherein the spring mechanism includes a coil spring interposed between the distally facing shoulder and the flange of the plunger so that retraction of the plunger into the passage of the proximal member is against a bias of the coil spring and movement of the plunger into the inoperative position is under action of the coil spring.

7. The interdental cleaning device as claimed in claim 1, wherein the interdental cleaning member includes a carrier that is releasably engageable with the head at a proximal end of the cavity, the interdental cleaning element being engaged with the carrier to extend distally.

8. The interdental cleaning device as claimed in claim 1, wherein the interdental cleaning member includes a carrier, and the proximal end and the carrier define a clipping mechanism so that the carrier can be clipped onto and unclipped from the proximal member, the interdental cleaning element being engaged with the carrier to extend distally.

9. The interdental cleaning device as claimed in claim 7, wherein the carrier includes a tubular member that extends into the cavity when the carrier is engaged with the head, a proximal portion of the interdental cleaning element being retained in the tubular member.

10. The interdental cleaning device as claimed in claim 9, wherein the interdental cleaning element is an interdental cleaning brush, and the proximal portion of the interdental cleaning element is a stem of the interdental cleaning brush that is received in the tubular member, with a distal portion of the interdental cleaning brush, carrying cleaning projections, extending from the tubular member, the distal portion being received in the longitudinal passage of the plunger.

11. An interdental cleaning device, which comprises:
a handle; and
a cleaning head assembly that is mounted on the handle, the cleaning head assembly including:
a head that is mounted on the handle, the head defining a cavity and comprising;
a distal side and a proximal side, with a generally central axis of the head extending through the distal and proximal sides of the head; and
a proximal member and a distal member, the distal member being detachably connected to the proximal member, the proximal member defining part of the cavity in the form of an elongate passage that extends through the proximal member to open at respective proximal and distal sides of the proximal member, wherein an inner surface of the proximal member that defines the passage is stepped in proximity to the proximal side to define a distally facing shoulder, and an end wall of the distal member defining a passage that is coaxial with the passage of the proximal member, the passage of the distal member being narrower than the passage of the proximal member so that a proximally facing shoulder is defined by the end wall of the distal member, and the inner surface of the proximal member;
an interdental cleaning member that is mounted on the head to extend into the cavity, the interdental cleaning member including a carrier for retaining an interdental cleaning element; and
a plunger that is mounted on the head, the plunger being reciprocally displaceable relative to the head between an operative position in which the plunger is at least partially retracted into the cavity and an inoperative position in which the plunger extends from the cavity, a spring mechanism being interposed between the plunger and the head so that the movement of the plunger into the operative position is against a bias of the spring mechanism, the plunger defining a longitudinally extending passage that is dimensioned to accommodate the cleaning element, and the interdental cleaning member being positioned so that the interdental cleaning element extends from a distal opening of the longitudinal passage when the plunger is in the operative position and is positioned within the plunger when the plunger is in the inoperative position, the plunger including a flange and a nose extending from the flange, the flange being dimensioned to seat on the proximally facing shoulder, and the nose being dimensioned to extend through the passage of the distal member end wall and the passage defined by the plunger extending through the flange and the nose and being coaxial with the passages of the proximal and distal members.

\* \* \* \* \*